(12) United States Patent
Satoh et al.

(10) Patent No.: US 10,976,544 B2
(45) Date of Patent: Apr. 13, 2021

(54) DISPLAY DEVICE AND APPARATUS

(71) Applicant: RICOH COMPANY, LTD., Tokyo (JP)

(72) Inventors: Yuuki Satoh, Kanagawa (JP); Kazuhiro Fujita, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 118 days.

(21) Appl. No.: 16/270,733

(22) Filed: Feb. 8, 2019

(65) Prior Publication Data

US 2019/0285885 A1   Sep. 19, 2019

(30) Foreign Application Priority Data

Mar. 19, 2018   (JP) .............................. JP2018-051607

(51) Int. Cl.
| *G02B 27/01* | (2006.01) |
| *G02B 3/00* | (2006.01) |
| *G02B 5/02* | (2006.01) |
| *G02B 26/10* | (2006.01) |

(52) U.S. Cl.
CPC ....... *G02B 27/0101* (2013.01); *G02B 3/0056* (2013.01); *G02B 5/021* (2013.01); *G02B 5/0257* (2013.01); *G02B 5/0278* (2013.01); *G02B 26/101* (2013.01)

(58) Field of Classification Search
CPC  G02B 27/0101; G02B 3/0056; G02B 5/0278; G02B 5/021; G02B 26/101; G02B 5/0257
See application file for complete search history.

(56) References Cited

U.S. PATENT DOCUMENTS

| 2012/0170134 A1* | 7/2012 | Bolis ........................ G02B 3/14 |
| | | 359/666 |
| 2015/0219803 A1 | 8/2015 | Inamoto et al. |
| 2016/0334637 A1 | 11/2016 | Saisho et al. |
| 2018/0252916 A1 | 9/2018 | Nakamura et al. |
| 2018/0267306 A1 | 9/2018 | Nakamura et al. |

FOREIGN PATENT DOCUMENTS

| JP | 2015-232692 | 12/2015 |
| JP | 2017-049371 | 3/2017 |
| JP | 2017-173557 | 9/2017 |

* cited by examiner

*Primary Examiner* — Wen Huang
(74) *Attorney, Agent, or Firm* — Xsensus LLP

(57) ABSTRACT

A display device and an apparatus. The display device includes light emitter to emit light, an image generator to generate image light using the light emitted from the light emitter, a diffusion plate configured to diffuse the image light, and a light condensing element to receive and condense the image light diffused by the diffusion plate. A component in an optical path between the light emitter and the diffusion plate is disposed at a position different from a position of a light condensing portion of external light having transmitted through the diffusion plate via the light condensing element. The apparatus includes a light emitter to emit light, an image generator to generate image light using the light emitted from the light emitter, a diffusion plate to diffuse the image light, and a concave mirror to reflect the image light diffused by the diffusion plate to a transmission reflection member.

14 Claims, 8 Drawing Sheets

DISPLAY DEVICE AND APPARATUS

CROSS-REFERENCE TO RELATED APPLICATION

This patent application is based on and claims priority pursuant to 35 U.S.C. § 119(a) to Japanese Patent Application No. 2018-051607, filed on Mar. 19, 2018, in the Japan Patent Office, the entire disclosure of which is hereby incorporated by reference herein.

BACKGROUND

Technical Field

Embodiments of the present disclosure relate to a display device and an apparatus.

Description of the Related Art

There has been used a display device such as a heads-up display (HUD) that enables an observer (a driver) to recognize various information (for example, speed information, traffic information, navigation information, warning information, and the like) with less line-of-sight movements in a mobile object such as a vehicle. Such a display device commonly projects an original image formed on a screen by laser scanning on a transmission reflection member such as a windshield, thus displaying a virtual image that can be visually recognized by the observer.

A configuration of a vehicle HUD is disclosed, in which for the purpose of increasing an original image (a display image) in size and reducing the influence of external light (sunlight), a transmission member that transmits visible light and reflects infrared light is disposed on an optical path between a first concave mirror that reflects light emitted from a screen (a display) on which the original image is formed and a second concave mirror that reflects light emitted from the first concave mirror to a windshield, and a member having high thermal conductivity or high heat resistant temperature is disposed near the transmission member (Patent Literature 1).

A light condensing element such as a concave mirror is commonly used for forming a virtual image in a HUD. If external light such as sunlight enters a display device, external light is condensed in the device by the light condensing action of the light condensing element, and if a component (for example, an optical element, an electronic device, a casing member, or the like) of the display device is present near a light condensing portion, the temperature of the component rises and thus the component may be damaged. For example, external light condensed by the light condensing element may transmit through a screen and damage a light emission mechanism, a scanning mechanism, and the like. Consequently, optical characteristics of the screen may be a factor of changing the extent of the influence of external light.

The basic function required for the screen is to serve as a projected surface and form an image. However, in terms of securing brightness, it is important for the screen to have diffusion characteristics for making light that forms a virtual image. That is, if light is diffused in a direction in which light does not form a virtual image, light is wasted and light use efficiency is reduced. Therefore, by appropriately setting the diffusion angle of the screen, light that forms a virtual image can be efficiently obtained and a bright display device with high brightness can be achieved.

A microlens array is a member used as the screen. By using a microlens array having specific optical characteristics (diffusion characteristics) as the screen, it is possible to achieve brightness and improve image quality accordingly. However, depending on the optical characteristics of the microlens array, there sometimes arises a problem that the light condensing property of external light reflected by a concave mirror is promoted. Therefore, it is difficult to achieve brightness, improve image quality, and reduce the influence of external light at the same time. Conventional techniques cannot solve such problems.

SUMMARY

Embodiments of the present disclosure described herein provide a display device and an apparatus. The display device includes light emitter to emit light, an image generator to generate image light using the light emitted from the light emitter, a diffusion plate configured to diffuse the image light, and a light condensing element to receive and condense the image light diffused by the diffusion plate. A component in an optical path between the light emitter and the diffusion plate is disposed at a position different from a position of a light condensing portion of external light having transmitted through the diffusion plate via the light condensing element. The apparatus includes a light emitter to emit light, an image generator to generate image light using the light emitted from the light emitter, a diffusion plate to diffuse the image light, and a concave mirror to reflect the image light diffused by the diffusion plate to a transmission reflection member.

According to one aspect of the present disclosure, it is possible to reduce the influence of external light without degrading image quality.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein.

Figure 1:
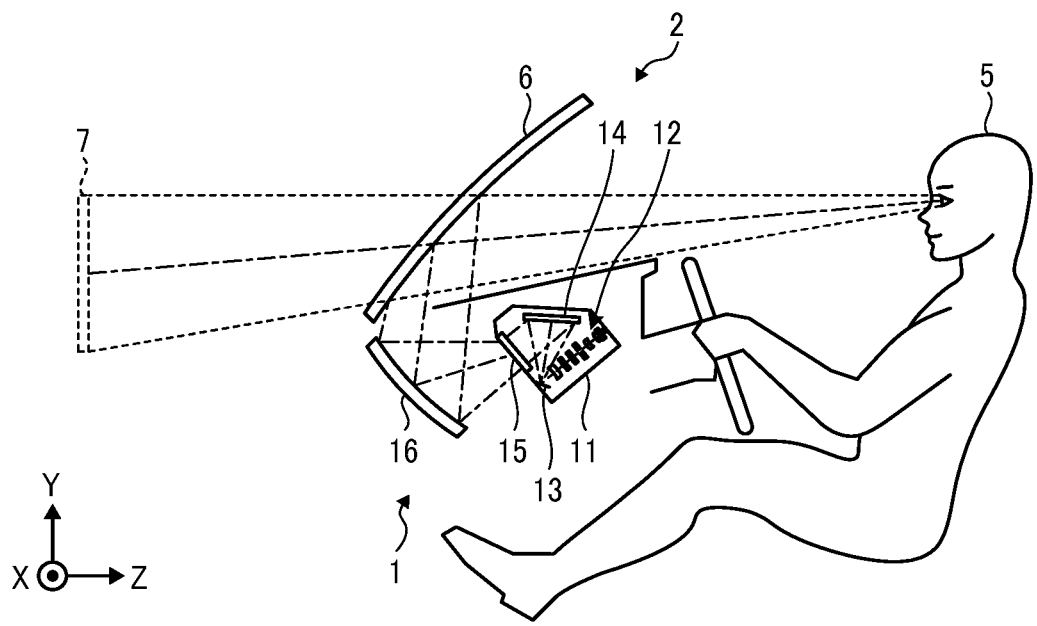
FIG. 1 is a view illustrating an overall configuration of a display device and an apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present disclosure. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Embodiments of a display device and an apparatus will be described hereinafter in detail with reference to the accompanying drawings. The present disclosure is not limited by the following embodiments, and constituent elements in the following embodiments include those that can be easily conceived by those skilled in the art, those that are substantially the same, and those within the so-called equivalent scope of the disclosure. Various omissions, substitutions, changes, and combinations of constituent elements can be made without departing from the subject of the following embodiments.

FIG. 1 is a view illustrating an overall configuration example of a display device 1 and an apparatus 2 according to an embodiment.

The display device 1 according to the present embodiment is a HUD mounted on the apparatus 2. The apparatus 2 may be a mobile object such as a vehicle, an aircraft, and a vessel or an immobile object such as a steering simulation system and a home theater system. A HUD (an example of the display device 1) mounted on a vehicle (an example of the apparatus 2) will be described as an example.

The display device 1 displays a virtual image 7 that can be visually recognized by an observer (a vehicle's driver) 5 through a windshield 6 (transmission reflection member). The display device 1 includes a casing 11, a light emitter 12, a scanning unit 13, a deflection mirror 14, a microlens array 15 (diffusion plate), and a concave mirror 16.

The casing 11 is a casing member that houses the light emitter 12, the scanning unit 13, the deflection mirror 14, and the microlens array 15. While the material and shape of the casing 11 should be appropriately selected according to use conditions, resins that are excellent in solidity, heat resistance, light-weight property, moldability, and the like can be used.

Figure 2:
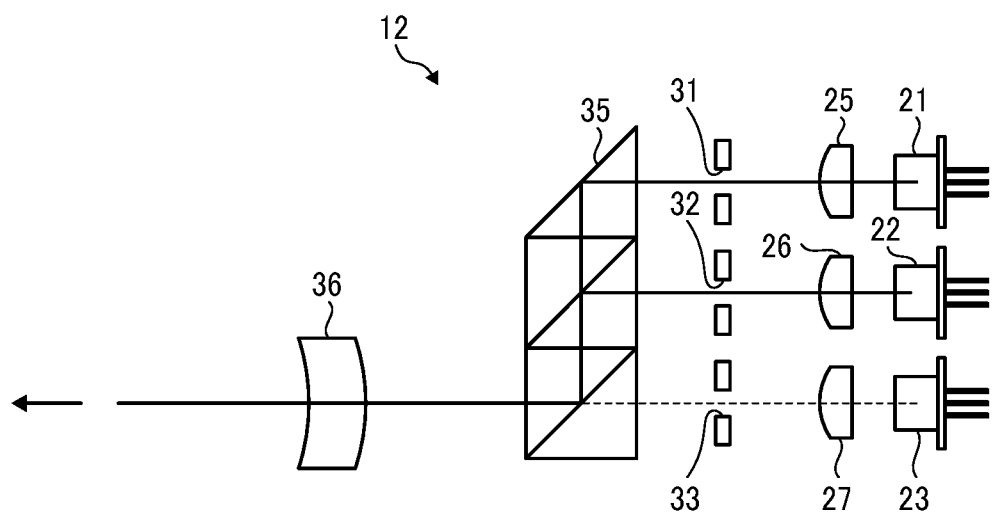
FIG. 2 is a view illustrating a configuration of a light emitter according to an embodiment of the present disclosure.

The light emitter 12 is a mechanism for emitting laser light. FIG. 2 is a view illustrating a configuration example of the light emitter 12 according to an embodiment of the present disclosure. The light emitter 12 according to this example includes LDs (semiconductor laser elements) 21, 22, and 23, coupling lenses 25, 26, and 27, apertures 31, 32, and 33, a combining element 35, and a meniscus lens 36.

The LDs 21, 22, and 23 emit light beams having different wavelengths (for example, 640 nm, 530 nm, and 445 nm). The light beams emitted respectively from the LDs 21, 22, and 23 are coupled to subsequent optical systems by the corresponding coupling lenses 25, 26, and 27. The light beams emitted respectively from the coupling lenses 25, 26, and 27 are shaped by the corresponding apertures 31, 32, and 33. While the shape of the apertures 31, 32, and 33 should be appropriately selected according to use conditions, the shape may be, for example, a circle, an ellipse, a rectangle, or a square. The light beams emitted respectively from the apertures 31, 32, and 33 pass through the combining element 35 to be combined into one light beam that travels along one optical path. While the specific configuration of the combining element 35 should be appropriately selected according to use conditions, the combining element may be, for example, a plate-like or prismatic dichroic mirror. In this case, the combining element 35 reflects or transmits each light beam based on the wavelength, and combines the optical paths of the light beams into one optical path. The meniscus lens 36 is disposed so that a surface facing the scanning unit 13 is a concave surface. The light beam combined by the combining element 35 to travel along one optical path is guided to the scanning unit 13 through the meniscus lens 36.

The scanning unit 13 is a mechanism that changes a forward direction of movement of laser light emitted from the light emitter 12 to generate scanning light. While the specific configuration of the scanning unit 13 is appropriately selected according to use conditions, the scanning unit 13 may be constituted by, for example, a micro electro mechanical systems (MEMS) mirror and a circuit for controlling an operation of the MEMS mirror (a microprocessor, a logic circuit, or the like).

The scanning unit 13 forms an intermediate image by scanning laser light on a diffusion plate serving as a projected surface. That is, the scanning unit 13 executes control of turning on and off laser light synchronized with a scanning timing based on image information to be displayed, thus forming an intermediate image on the diffusion plate. The intermediate image is formed into the virtual image 7 through the windshield 6 by the light condensing action of the concave mirror 16. That is, the intermediate image is formed by the diffusion function of the projected surface, and the intermediate image is used as the virtual image 7. Without the diffusion function, projected rays travel without any change and thus are not recognized as an image, so that the virtual image 7 is not formed. That is, the diffusion plate has an important function in forming the virtual image 7. However, if diffusion characteristics are achieved as perfect diffusion, that is, if incident light is diffused thoroughly, light is wasted. That is, even if there is diverging light having an angle of view larger than or equal to an angle of view of light taken in by the concave mirror 16 that serves as an observation optical system and forms the virtual image 7, the diverging light does not reach the observer 5 and thus is wasted. To increase brightness, it is effective to use a diffusion plate having a limited divergence angle, such as the microlens array 15. Since the refractive power of the microlens array 15 can be adjusted by using a light refraction action according to the shape of a curved surface of the microlens array 15, the curved surface may be formed in a desired shape so as not to generate a useless wide diffusion angle, so that the diffusion angle is controlled and set. It is important to achieve the diffusion function that does not allow the intensity of light travelling straight to be less than or equal to the intensity of surrounding light not travelling straight. That is, if there are any diffusion plates having such a function, it is not necessary to use the microlens array 15. A diffusion plate using a prism array, a micro Fresnel lens, or a fine diffraction grating may be used. Any means may be used as long as it is possible to achieve the diffusion function that allows the intensity of light traveling straight to be larger than the intensity of surrounding light. Hereinafter, the present embodiment will describe an example of using the microlens array 15 as a diffusion plate.

The deflection mirror 14 reflects laser light (scanning light) emitted from the scanning unit 13. As the deflection mirror 14 is disposed, it is possible to downsize the display device 1 and to address restrictions in the shape of the display device 1 at a mounting position, and the like.

The microlens array 15 transmits scanning light reflected by the deflection mirror 14 and diffuses the scanning light at a predetermined divergence angle. The microlens array 15 functions as a screen on which an original image (intermediate image) serving as a source of the virtual image 7 is formed.

The concave mirror 16 has a function of converting diverging light into converging light for the purpose of forming an original image formed on the microlens array 15 as the virtual image 7 a few meters ahead of an observer. While the present embodiment describes the concave mirror 16 as an example, other elements (light condensing elements) having the function can be used. For example, a transmissive lens element, a Fresnel lens, a Fresnel reflective element, and a diffraction grating can be used as the light condensing element. A metal thin film of aluminum or silver having high reflectance is commonly formed on a reflective light condensing element by vapor deposition, sputtering, or the like. It is possible to acquire a virtual image having high brightness by maximizing light use efficiency. However, the reflectance of external light such as sunlight having a wavelength distribution that is not present in projected light (from the ultraviolet region of 300 nm to the near-infrared region of 800 nm to 2500 nm) is increased accordingly. In particular, the influence of external light condensed by the reflective light condensing element may be increased.

Figure 3:
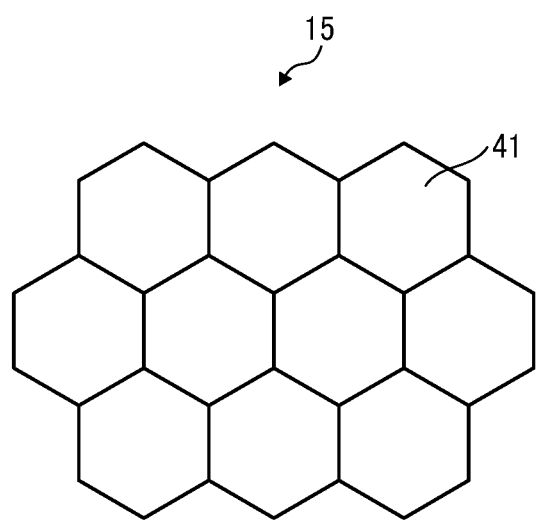
FIG. 3 is a view illustrating a configuration of a microlens array according to an embodiment of the present disclosure.

FIG. 3 is a view illustrating a configuration example of the microlens array 15 according to the present embodiment.

The microlens array 15 according to this example has a structure in which a plurality of hexagonal microlenses 41 are arranged without any gaps. Each microlens 41 may have a size of approximately 200 μm in width. As the microlens 41 has such a hexagonal shape, it is possible to with high-density arrange the microlenses 41. The shape of the microlens 41 is not limited to a hexagon, and the shape may be a rectangle, a triangle, or the like. While the structure in which the microlenses 41 are regularly arranged is illustrated, the arrangement of the microlenses 41 may be an irregular arrangement (an eccentric arrangement) in which the centers of the microlenses 41 are made eccentric from each other. When the eccentric arrangement is employed, the microlenses 41 respectively have a different shape.

Figure 4:
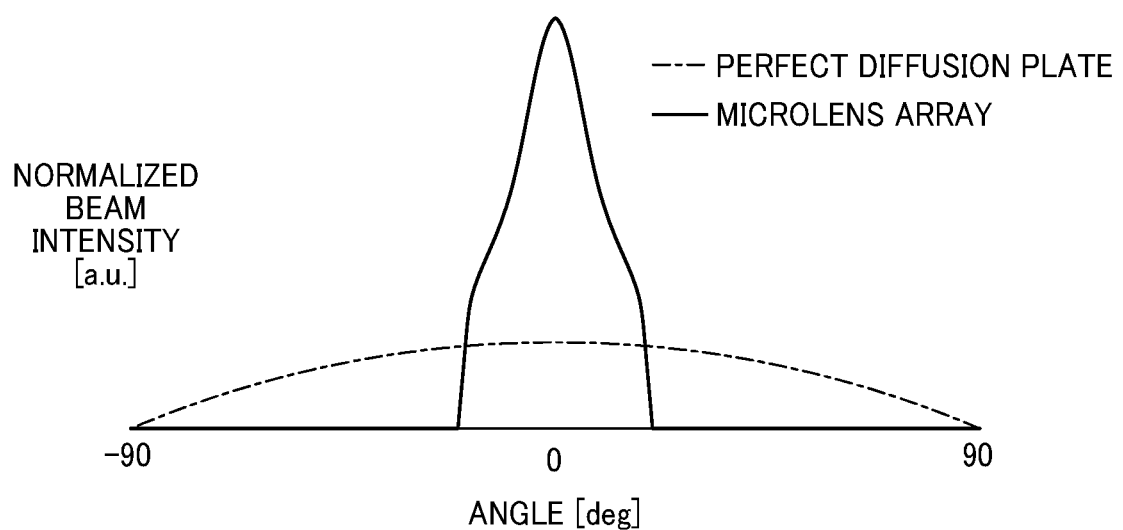
FIG. 4 is a graph illustrating a comparative example of a diffusion profile of the microlens array according to an embodiment of the present disclosure and a diffusion profile of a perfect diffusion plate.

FIG. 4 is a graph illustrating a comparative example of a diffusion profile of the microlens array 15 according to the present embodiment and a diffusion profile of a perfect diffusion plate.

In the graph, the horizontal axis "angle" represents the incident angle of a light beam incident on the microlens array 15 from a side of the scanning section 13 (the deflection mirror 14), and the vertical axis "normalized beam intensity" represents the rate of intensity of a light beam having transmitted through the microlens array 15. In FIG. 4, the diffusion profile of the microlens array 15 according to the present embodiment is indicated by a solid line, and the diffusion profile of a complete (uniform) diffusion plate serving as a comparison target is indicated by a one-dot chain line. The diffusion profile of the perfect diffusion plate has a substantially perfect circular shape in which the normalized beam intensity is maximized at an incident angle of 0° and gradually decreases as the absolute value of the incident angle increases. On the other hand, the diffusion profile of the microlens array 15 has a relatively sharp peak shape in which the normalized beam intensity is maximized at an incident angle is 0°.

Figure 5:
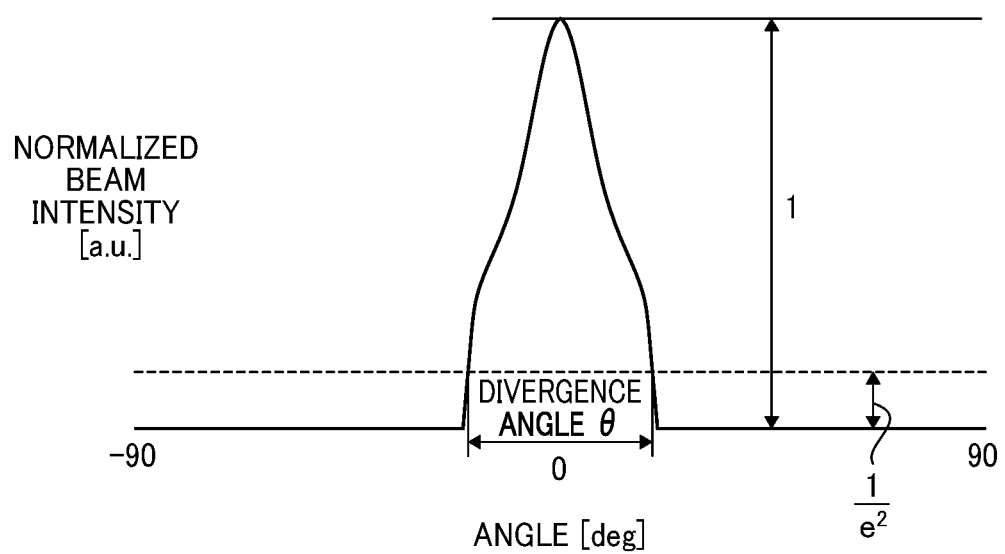
FIG. 5 is a graph illustrating a divergence angle θ of a microlens array according to an embodiment of the present disclosure.

FIG. 5 is a graph illustrating an example of a divergence angle θ of the microlens array according to the present embodiment.

The microlens array 15 has a specific divergence angle θ at which the virtual image 7 with good image quality can be acquired. The divergence angle θ represents the difference between two incident angles when the normalized beam intensity is 1/e2 times the maximum value. The divergence angle θ of the microlens array 15 according to the present embodiment is within a range of 30° to 50°.

Figure 6:
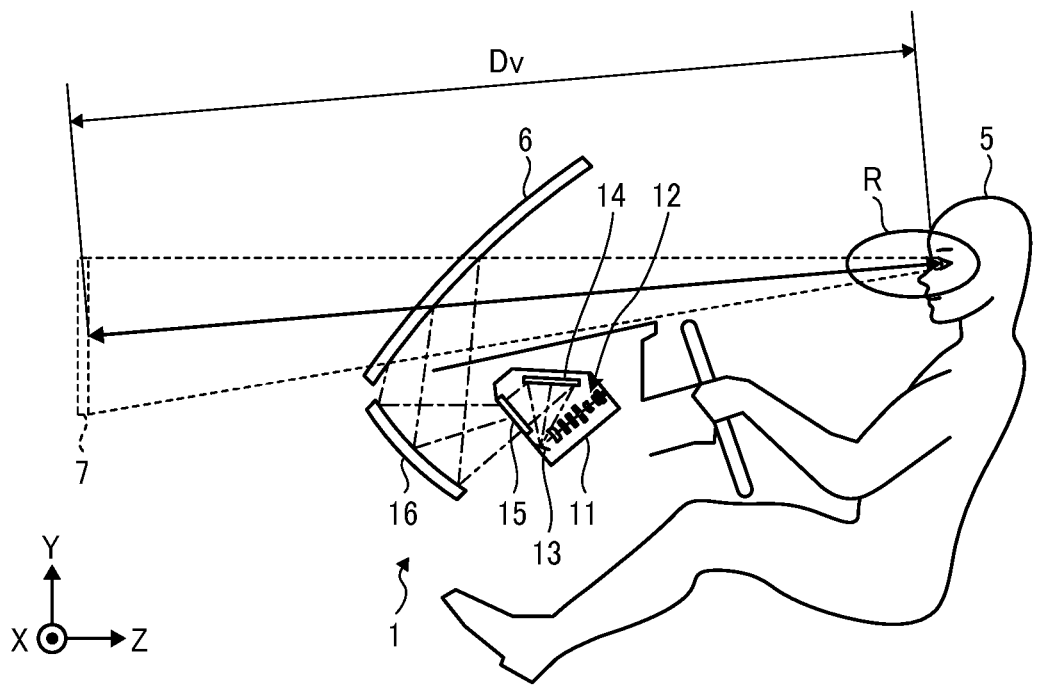
FIG. 6 is a view illustrating a virtual image distance and a field of view range that relate to the divergence angle of a microlens array according to an embodiment of the present disclosure.

FIG. 6 is a view illustrating examples of a virtual image distance Dv and a field of view range R that relate to the divergence angle θ of the microlens array 15 according to the present embodiment.

In view of visibility and downsizing, the HUD mounted on a vehicle is preferably designed that the virtual image distance Dv is 2 m to 5 m and the field of view range R covers an eyelips. In order to satisfy such conditions, it is preferable that the divergence angle θ of the microlens array 15 is within the range of 30° to 50°. By using the microlens array 15 having the divergence angle θ described above as a screen on which an original image is formed, it is possible to display the virtual image 7 that is brighter (has higher image quality) than that formed by using the perfect diffusion plate.

Figure 7:
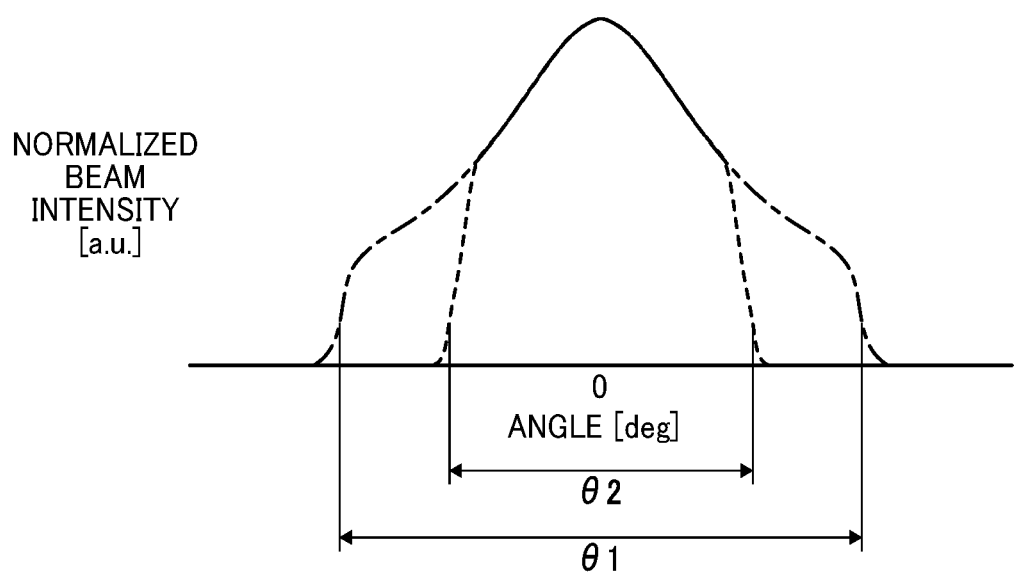
FIG. 7 is a view illustrating diffusion profiles of a microlens array in a main scanning direction and a sub-scanning direction, according to an embodiment of the present disclosure.

FIG. 7 is a view illustrating examples of diffusion profiles of the microlens array 15 according to the present embodiment in a main scanning direction and a sub-scanning direction.

As illustrated in FIG. 7, in the microlens array 15 according to the present embodiment, a divergence angle θ1 in the main scanning direction is larger than a divergence angle θ2 in the sub-scanning direction. With such a profile, it is possible to increase a processing speed by reducing the movement distance of scanning light in the main scanning direction at the time of forming an original image (the virtual image 7) that is long in the main scanning direction. Assuming that the observer 5 is a vehicle's driver, the head of the observer 5 sitting on the seat is more likely to swing in a horizontal direction than in a vertical direction. Consequently, it is possible to easily keep the visibility of the virtual image 7 by the observer 5 when the divergence angle is larger in the horizontal direction than in the vertical direction. In addition, as the windshield 6 is long in the horizontal direction, the virtual image 7 is also assumed to be long in the horizontal direction (oblong). In such a case as well, it is easy to deal with the divergence angle that is larger in the horizontal direction than in the vertical direction.

Figure 8:
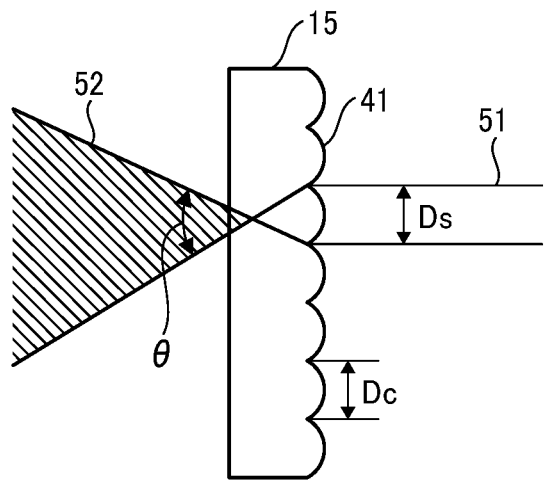
FIG. 8 is a view illustrating an arrangement period of microlenses in the microlens array according to an embodiment of the present disclosure.

FIG. 8 is a view illustrating an example of an arrangement period Dc of the microlenses 41 in the microlens array 15 according to the present embodiment.

The arrangement period Dc of the microlenses 41 according to the present embodiment is larger than the diameter Ds of the light beam of scanning light 51. It is thus possible to diffuse transmitted light 52 (light constituting an original image) transmitted through the microlens array 15 at a desired divergence angle θ (θ1 in the main scanning direction and θ2 in the sub-scanning direction).

Figure 9:
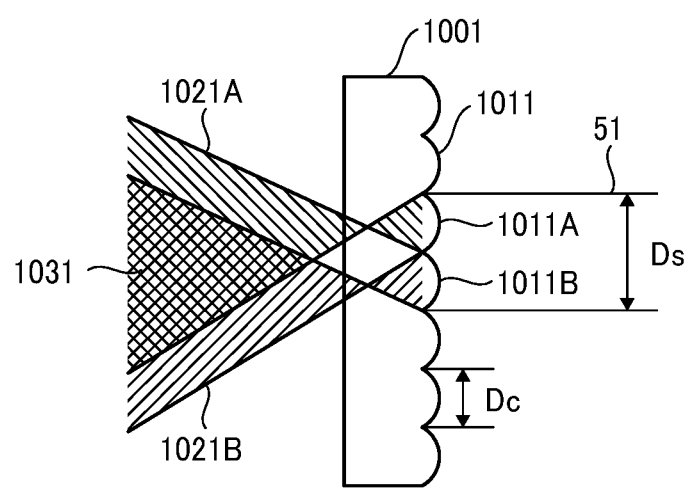
FIG. 9 is a view illustrating an arrangement period of microlenses in a microlens array according to a comparative example.

FIG. 9 is a view illustrating an example of the arrangement period Dc of microlenses 1011 in a microlens array 1001 according to a comparative example.

The arrangement period Dc of the microlenses 1011 according to the present comparative example is less than the diameter Ds of the light beam of the scanning light 51. In this case, the scanning light 51 is simultaneously incident on two adjacent microlenses 1011A and 1011B, and transmitted light beams 1021A and 1021B are emitted from the microlenses 1011A and 1011B, respectively. At this time, an overlapping region 1031 where the transmitted light beams 1021A and 1021B are simultaneously present appears and an interference light beam is generated. When entering eyes of the observer 5, the interference light beam is visually recognized as speckles.

As described above, the arrangement period Dc of the microlenses 41 is preferably larger than the diameter Ds of the light beam the scanning light 51. While the above example describes a case of using a convex lens, the same is true for a concave lens.

Figure 10:
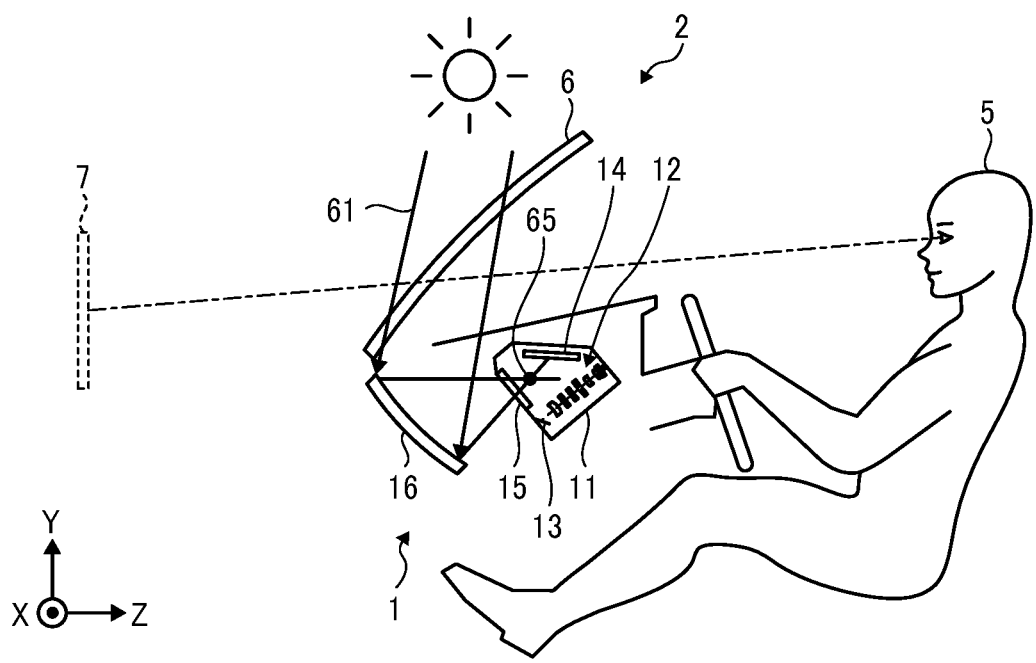
FIG. 10 is a view illustrating the influence of external light in the display device according to an embodiment of the present disclosure.

FIG. 10 is a view illustrating an example of the influence of external light 61 in the display device 1 according to the present embodiment.

When the external light 61 including sunlight travels along an optical path opposite to an optical path for displaying the virtual image 7 to enter the display device 1 through the windshield 6, a light condensing portion 65 is formed by the light condensing action of the concave mirror 16. When the external light 61 travels along an optical path different from the optical path for displaying the virtual image 7 to enter the display device through the windshield 6, the external light 61 is blocked by the casing 11.

Figure 11:
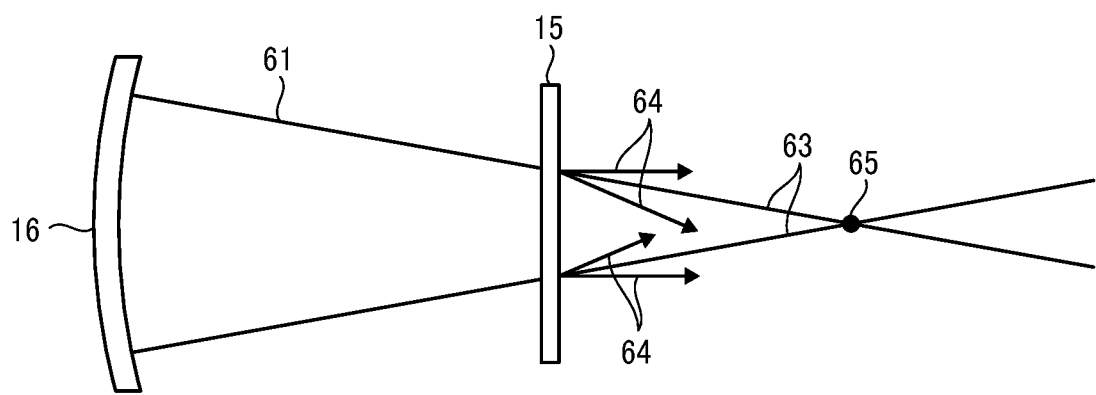
FIG. 11 is a view conceptually illustrating a state where a light condensing portion is formed in the display device according to an embodiment of the present disclosure.

FIG. 11 is a view conceptually illustrating an example of a state where the light condensing portion 65 is formed in the display device 1 according to the present embodiment.

It is assumed that the external light 61 is a parallel light beam and includes sunlight whose light source is regarded as infinity. FIG. 11 does not illustrate the optical path of the external light 61, but illustrates a state where a light beam of the external light 61 that has passed through the windshield 6, a dustproof cover of the display device 1, and the like to reach the concave mirror 16 is reflected by the concave mirror 16. For simplicity, only the external light 61 reflected by the concave mirror 16 is illustrated. It is assumed that the external light 61 is at least two light rays arbitrary included in from a reflected light beam, and FIG. 11 illustrates a state of light condensing in the horizontal direction when the display device 1 is viewed from above. When the external light 61 reflected by the concave mirror 16 transmits through the microlens array 15, the external light 61 is divided into main transmitted light 63 which is straightly transmitted without being subjected to a diffusion action and diffused transmitted light 64 with being subjected to the diffusion action to be the diffused, and the light condensing portion 65 is formed by the main transmitted light 63. That is, the light condensing portion 65 herein is a portion where the main transmitted light 63 of the two external light rays 61 are the closest to each other. Consequently, the energy of the light condensing portion 65 increases as the intensity of the main transmitted light 63 increases.

If a diffusion plate such as the microlens array 15 is not present, a clear focal point is formed. However, as the diffusion plate is disposed, the intensity of the focal point is moderate. However, as described above, light traveling straight to be incident on the diffusion plate has higher intensity than surrounding light in terms of brightness. Consequently, energy is easily concentrated on the portion where straight optical paths intersect or are the closest to each other, that is, on a virtual light condensing portion. In other words, the irradiance near the light condensing portion is inevitably high. If a component of the display device 1 is disposed near the light condensing portion, unless the component is a 100% energy reflecting member, the temperature rises because of heat absorption. While the temperature rise is added to the environmental temperature, it is desirable to prevent the temperature rise as much as possible. Preferably, it is designed so that no components are present in the light condensing portion.

As the diffusion plate has the diffusion function, it is difficult to specify a clear focal point after the external light 61 such as sunlight passes through the diffusion plate. However, unless a perfect diffusion plate is used, light energy is concentrated on a portion where light travelling straight without being diffused is condensed, and thus a light condensing portion is present. According to characteristics of the disclosure, components of the display device 1 are not disposed in the light condensing portion in which light is expected to be condensed. If any component is present in the light condensing portion defined by the present application or if a conventional configuration designed without considering such a problem described is employed, the component of the display device 1 (for example, an optical element, an electronic device, a casing member, or the like) may be damaged. However, by employing the configuration of the present application, it is possible to prevent the possibility of damage and to achieve excellent effects such as high performance in view of safety and reliability. The present application embodies the technical idea.

In the present embodiment, examples of the component disposed so as to avoid the light condensing portion 65 include the light emitter 12 and the scanning unit 13 in the casing 11, and the deflection mirror 14. That is, components on the optical path between the light emitter 12 and the microlens array 15 functioning as a diffusion plate, including the light emitter 12, are disposed so as to avoid the light condensing portion 65. Components including a drive part such as the light emitter 12 and the scanning unit 13 are more likely to be damaged than components having only the function of mainly reflecting (or transmitting) light such as the deflection mirror 14. Consequently, the components including a drive part are preferably disposed with priority so as to avoid the light condensing portion 65.

The microlens array 15 according to the present embodiment has the optical characteristics as described above, and by using the microlens array 15 as a screen, the brightness of the virtual image 7 can be increased. On the other hand, when the microlens array according to the present embodiment is used, the intensity of the main transmitted light 63 tends to be relatively high (as compared with a case of using a perfect diffusing plate) or the energy density of the light condensing portion 65 tends to be increased in the casing 11. To achieve both improvement in image quality and reduction in the influence of the external light 61, the display device 1 according to the present embodiment is designed that the light condensing portion 65 of the external light 61 (the main transmitted light 63) reflected by the concave mirror 16 is located in the space, in other words, no components are present in the light condensing portion 65. In particular, the scanning unit 13 (a MEMS mirror or the like) exerts a significant influence on the display of the virtual image 7, and thus the scanning unit 13 is disposed at a position different from that of the light condensing portion 65.

In the present embodiment described with reference to FIG. 7, the divergence angle θ1 of the microlens array 15 in the main scanning direction is larger than the divergence angle θ2 of the microlens array 15 in the sub-scanning direction. As the field of view range R is large in the main scanning direction corresponding to the horizontal direction (an X axis direction), the effective diameter of the concave mirror 16, which is an observation optical system for forming the virtual image 7, is also larger in the horizontal direction (the X axis direction) than in the vertical direction (a Y axis direction). That is, the direction in which the divergence angle of the microlens array 15 is large matches the direction in which the effective area of the concave mirror 16 is large.

Meanwhile, the external light 61 is taken in by the concave mirror 16 widely in the horizontal direction (the X axis direction) in which the effective area is large. That is, as the divergence angle θ1 of the microlens array 15 in the main scanning direction is larger than the divergence angle θ2 of the microlens array 15 in the sub-scanning direction orthogonal to the main scanning direction, the horizontal energy density of the light condensing portion 65 formed by the external light 61 (the main transmitted light 63) can be reduced.

As the external light 61 taken in by the concave mirror 16 travels along an optical path that is deflected by the concave mirror 16 as illustrated in a Y-Z axis cross-section of FIG. 10, the external light 61 is inevitably obliquely incident on the concave mirror 16. It is thus possible to prevent an external light beam deflected in the Y axis direction as viewed from the cross-section from being condensed at one point. In light condensing by the concave mirror 16 on a Z-X axis cross-section, light is reflected along the central axis of the concave mirror 16, and thus light is easy to be condensed in the X axis direction. In addition, the light beam width of the external light 61 to be taken in is wide in the X axis direction. In other words, the energy density of the light condensing portion 65 is increased inevitably. Therefore, the light condensing portion 65 in the main scanning direction, that is, in a horizontal direction cross-section (a cross-section along the X axis) of the concave mirror 16 is preferably located in the space and components are preferably laid out so as not to be present near the light condensing portion 65.

Figure 12:
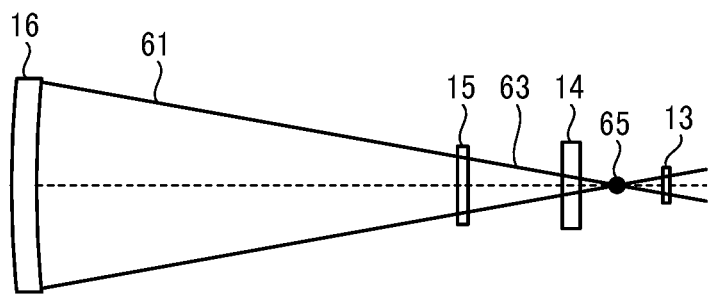
FIG. 12 is a top view conceptually illustrating the relative positions of components of a display device according to a first example of an embodiment of the present disclosure and a light condensing portion.
Figure 12:
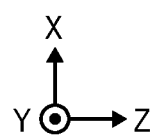

FIG. 12 is a top view conceptually illustrating an example of relative positions of components of the display device 1 according to a first example of the present embodiment and the light condensing portion 65.

Figure 13:
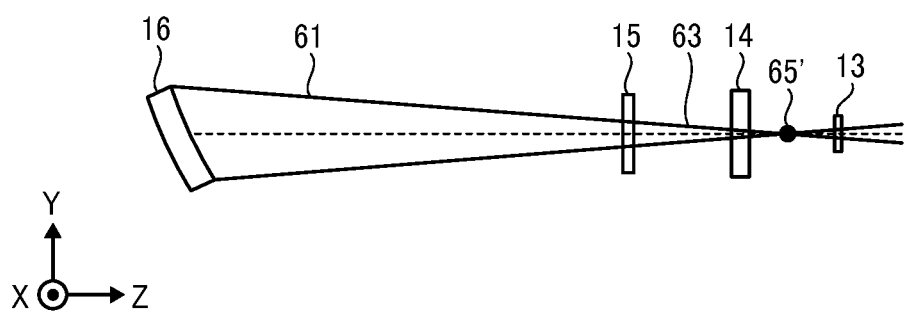
FIG. 13 is a side view conceptually illustrating the relative positions of components of a display device according to the first example of an embodiment of the present disclosure and a light condensing portion.
Figure 13:
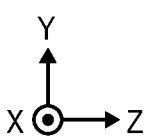

FIG. 13 is a side view conceptually illustrating an example of relative positions of the components of the display device 1 according to the first example of the present embodiment and a light condensing portion 65'.

FIGS. 12 and 13 illustrate relative positions of the scanning unit 13 (a MEMS mirror or the like), the deflection mirror 14, the microlens array 15, the concave mirror 16, and the light condensing portion 65. The light condensing portion 65 in the X axis direction may match the light condensing portion 65' in the Y axis direction but these light condensing portions do not necessarily match. The light condensing portion 65 according to this example is located in the space between the scanning unit 13 and the microlens array 15, more specifically, between the scanning unit 13 and the deflection mirror 14.

Figure 14:
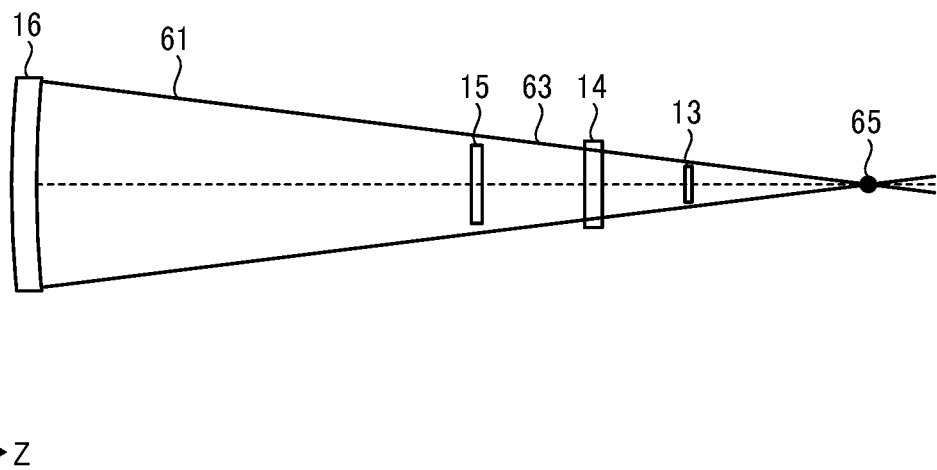
FIG. 14 is a top view conceptually illustrating the relative positions of components of a display device according to a second example of an embodiment of the present disclosure and a light condensing portion.

FIG. 14 is a top view conceptually illustrating an example of relative positions of components of the display device 1 according to a second example of the present embodiment and the light condensing portion 65.

Figure 15:
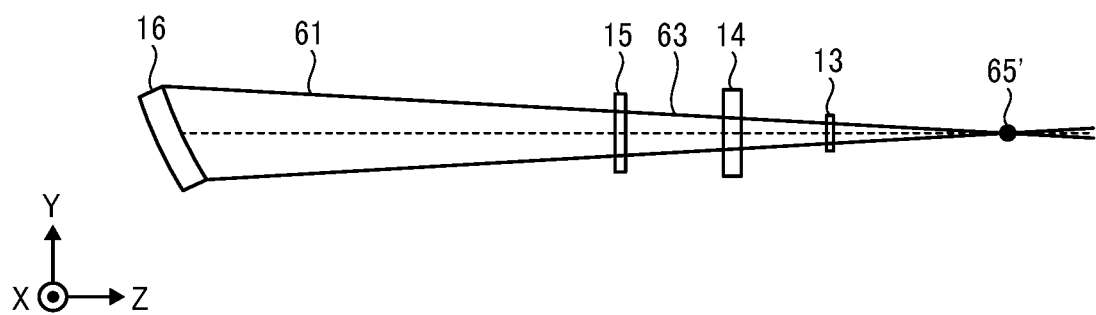
FIG. 15 is a side view conceptually illustrating the relative positions of components of a display device according to the second example of an embodiment of the present disclosure and a light condensing portion.

FIG. 15 is a side view conceptually illustrating an example of relative positions of the components of the display device 1 according to the second example of the present embodiment and the light condensing portion 65'.

In this example, the light condensing portion 65 is located in the space behind the scanning unit 13.

In two examples described above, the scanning unit 13 and the deflection mirror 14 are described as components to avoid contact with the light condensing portion 65 at least in the X axis direction. Similarly, the light emitter 12 and the casing 11 preferably avoid contact with the light condensing portion 65. It is not necessary to locate the light condensing portion 65 in the space within the casing 11. When the light condensing portion 65 is located in the space outside the casing 11, it is preferably designed that the light condensing portion 65 is located so as to avoid components of the apparatus 2 on which the display device 1 is mounted such as instruments, an air conditioning mechanism, a steering mechanism, and a pedal mechanism for vehicles.

While the above two examples describe an example of using the scanning unit 13 as an image generator having a function of forming an image formed on a diffusion plate, the present disclosure is not limited to this example. For example, a DMD (Digital Mirror Device) element or a reflective panel (LCOS) may be used as the image generator.

Components on the optical path from the light emitter 12 to the diffusion plate are not limited to the components described in the above example, and for example, mirrors other than the deflection mirror 14 and lenses may be disposed on the optical path.

As described above, according to the present embodiment, it is possible to prevent a problem such as a local temperature rise caused by the external light 61 even in a case of using the microlens array 15 capable of improving the image quality of the virtual image 7. It is thus possible to reduce the influence of the external light 61 without degrading the image quality of the virtual image 7.

The above-described embodiments are illustrative and do not limit the present disclosure. Thus, numerous additional modifications and variations are possible in light of the above teachings. For example, elements and/or features of different illustrative embodiments may be combined with each other and/or substituted for each other within the scope of the present disclosure.

Any one of the above-described operations may be performed in various other ways, for example, in an order different from the one described above.

The present disclosure can be implemented in any convenient form, for example using dedicated hardware, or a mixture of dedicated hardware and software. The present disclosure may be implemented as computer software implemented by one or more networked processing apparatuses. The processing apparatuses can compromise any suitably programmed apparatuses such as a general purpose computer, personal digital assistant, mobile telephone (such as a WAP or 3G-compliant phone) and so on. Since the present disclosure can be implemented as software, each and every aspect of the present disclosure thus encompasses computer software implementable on a programmable device. The computer software can be provided to the programmable device using any conventional carrier medium (carrier means). The carrier medium can compromise a transient carrier medium such as an electrical, optical, microwave, acoustic or radio frequency signal carrying the computer code. An example of such a transient medium is a TCP/IP signal carrying computer code over an IP network, such as the Internet. The carrier medium can also comprise a storage medium for storing processor readable code such as a floppy disk, hard disk, CD ROM, magnetic tape device or solid state memory device.

The invention claimed is:

1. A display device comprising:
a light emitter configured to emit light;
an image generator configured to generate image light using the light emitted from the light emitter;
a mirror which reflects the image light from the image generator;
a diffusion plate configured to diffuse the image light reflected by the mirror;
a light condensing element configured to receive and condense the image light diffused by the diffusion plate; and
a transmission reflection element that received light from the light condensing element and passes parallel external light therethrough, the parallel external light originating from an exterior of the transmission reflection element and being different from the light emitted by the light emitter,
wherein a focal point of the parallel external light which passes through the transmission reflection element and is reflected by the light condensing element is at a position different from a position of any component on an optical path of the display device,
wherein the parallel external light is focused between the diffusion plate and the mirror.

2. The display device according to claim 1, wherein the image generator is disposed at a position different from a position of the focal point of the parallel external light which has been reflected by the light condensing element and has been transmitted through the diffusion plate.

3. The display device according to claim 1, wherein the light emitter is disposed at a position different from a position of the focal point of the parallel external light which has been reflected by the light condensing element and has been transmitted through the diffusion plate.

4. The display device according to claim 1, wherein the diffusion plate has a diffusion characteristic that is not perfectly diffusive.

5. The display device according to claim 1, wherein the light condensing element is a concave mirror to reflect the image light diffused by the diffusion plate to the transmission reflection element.

6. The display device according to claim 1, wherein the diffusion plate is a microlens array that is not perfectly diffusive.

7. The display device according to claim 6, wherein a divergence angle of the microlens array is within a range of 30° to 50°.

8. The display device according to claim 6, wherein a divergence angle of the microlens array in a main scanning direction is larger than a divergence angle of the microlens array in a sub-scanning direction.

9. The display device according to claim 1, wherein the focal point of the parallel external light is in a space within a casing that houses the light emitter, the image generator, and the diffusion plate.

10. The display device according to claim 1, wherein the focal point of the parallel external light is in a space between the image generator and the diffusing plate.

11. The display device according to claim 1, wherein the focal point of the parallel external light is a light condensing portion as viewed from a main scanning direction.

12. The display device according to claim 1, wherein the image generator is disposed at a position different from a position of the focal point of the parallel external light in a horizontal cross-section of the light condensing element.

13. A display device according to claim 1, wherein the focal point of the parallel external light is a portion where at least two light rays included in a parallel external light beam travelling along an optical path opposite to an optical path of light reflected by the light condensing element to the transmission reflection element are reflected by the light condensing element and transmitted straight through the diffusion plate to be closest to each other.

14. The display device according to claim 1, wherein the transmission reflection element includes a curved surface.

* * * * *